July 22, 1924.

C. C. ALVORD 1,502,006

EDUCATIONAL ARTICLE

Filed Sept. 4, 1923

INVENTOR
Charles C. Alvord

Patented July 22, 1924.

1,502,006

UNITED STATES PATENT OFFICE.

CHARLES CLINTON ALVORD, OF WORCESTER, MASSACHUSETTS.

EDUCATIONAL ARTICLE.

Application filed September 4, 1923. Serial No. 660,751.

*To all whom it may concern:*

Be it known that I, CHARLES CLINTON ALVORD, a citizen of the United States, residing at Worcester, in the county of Worcester and State of Massachusetts, have invented a new and useful Educational Article, of which the following is a specification.

The main object of my invention is to provide a new educational device consisting of a suitable soluble body which normally conceals the educational feature in whole or in part.

A further object of my invention consists in the details of construction and arrangement shown by the drawings and pointed out in the claims.

With the above and other objects in view my invention consists in the device and its construction disclosed in the drawings and specification and more particularly pointed out in the claims. I will now disclose one good form in which I expect to apply it.

In the drawings wherein similar reference characters designate similar parts throughout the respective views.

Figure 1:
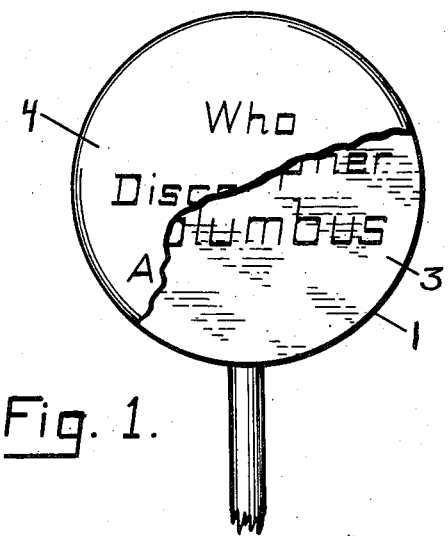
Figure 1 is a front view of a lolly-pop showing a question directly on the surface of the candy which is partially broken away to disclose the answer the lower part of the holder being also broken away.
Figure 2:
Figure 2 is a section taken on X—X of Figure 3.
Figure 3:
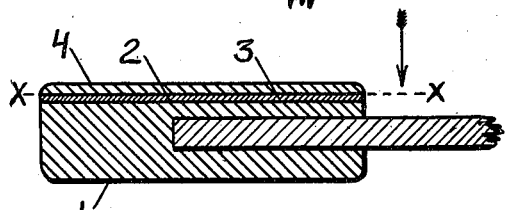
Figure 3 is a cross section showing the outer opaque coating, the transparent covering over the answer, the main portion of the lolly-pop upon which is the answer and the lolly-pop holder which is broken away.

Figure 3 shows a lolly-pop 1, preferably of a relatively hard candy, which has located on its surface 2 the answer to some question, that for purposes of illustration may be—Christopher Columbus—as shown in Figure 2. A transparent candy coating 3 may be laid over this answer so that it will not be obliterated as the outer, opaque, candy coating 4, which normally hides the answer, is dissolved. As shown by Figure 1 this opaque coating 4 bears the question —Who discovered America—which corresponds to the hidden answer.

I employ a harmless dye of suitable color when thus printing the question and answer directly on their respective layers of candy.

Figure 4:
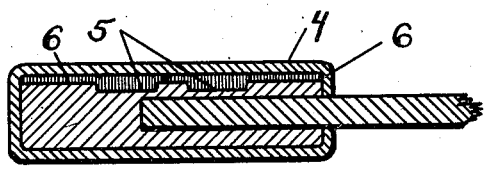
Figure 4 is another section showing the answer impressed in the lolly-pop and filled in with a colored candy, both being coated with an opaque layer.

It is possible to avoid the use of the transparent coating 3 by impressing the characters revealing the delineated thought into the body of the lolly-pop as shown at 5 in Figure 4. The impressions are then filled in with a suitably colored candy 6 after which the confection is dipped into an opaque candy to form a coating 4. As the opaque coating is sucked off, and the colored layer similarly becomes thinner, the delineated thought will be plainly seen since the letters, or characters, will be of a deeper shade due to the greater thickness of the colored layer 6 at those points. The above method may be preferable in case the use of a dye in printing the answer on the surface 2 is considered objectionable. The use of the colored candy avoids such criticism and is merely another method of preserving the answer.

Figure 5:
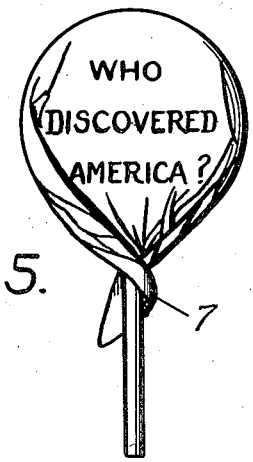
Figure 5 is a front view of a lolly-pop in a wrapper which has the question thereon.

Since lolly pops are inclined to be sticky it is customary to enclose them in a protective wrapper so in case it proves desirable not to print the question directly on the surface of the candy as in Figure 1 another method is disclosed in Figure 5 which shows the question normally appearing on the paper wrapper 7. In case the question was printed on the surface of the candy as in Figure 1, the wrapper would hide the question, so it may be considered preferable to print the question directly on the wrapper in order that it normally may be visible and arouse the interest of the purchaser.

A cross section of the lolly-pop, in the above case, would be as shown by either Figures 3 or 4, or any other suitable means of concealing the answer may be adopted. In such a case the question is omitted on the surface of the lolly-pop.

Figure 6:
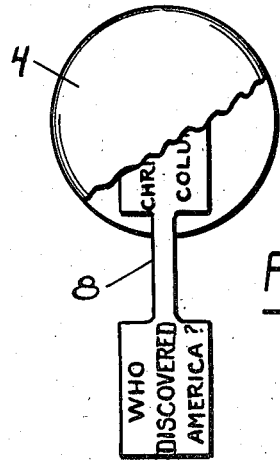
Figure 6 shows the lolly-pop holder with question and answer thereon, the latter being hidden by the candy which is shown partially broken away.

Figure 6 shows a lolly-pop holder 8 suitably shaped so that both question and answer may be printed thereon. One advantage of this type of construction is its simplicity and certainty that question and answer are related. In the previous types after the answer has been concealed by an opaque coating there is a chance that by carelessness an unrelated question might be printed on the outer surface or on the wrapper and it would be impossible to detect the error. A simple inspection of the lolly pop holder before it is covered by the candy will detect any discrepancy between question and answer. In this case no special opaque coating would be required as the lolly-pop itself would be opaque enough to obscure the answer.

It is of course obvious that the questions and answers do not have to be historical, in fact they could be of an advertising or interest arousing nature. Indeed there need not be a normally visible delineation, for that which is revealed by the removal of the outer coating can fulfill all the requirements as to the usefulness of this device.

Good advertising is generally educational and in some of the claims I have used the term "revealed, delineated conception" to show broadly that a thought, or an idea, is visible in order that the interest of the observer may be aroused to seek added information by sucking the confection.

It is not necessary to use candy to carry out the educational value of this invention, for any soluble substance such as soap, could be employed, in which case the outer coating would be dissolved by immersion in water.

In this specification and drawing I have shown my new and useful educational article, or device, as made largely of candy, and have also explained that it could equally as well be constructed of soap. However, it is manifest that any suitable medium could be employed for hiding the thought that is to be revealed, without departing from the spirit of my invention. It is also understood that I do not limit the delineations to questions and answers, since any related delineations may be used for the purpose.

Having thus plainly shown and described my invention what I claim as new and desire to secure by Letters Patent is.

1. An educational device composed of a soluble body partially covering a relatively insoluble substance which bears an educational feature, a portion only of said feature normally being concealed by said body.

2. An educational device consisting of a soluble substance partially covering a relatively insoluble body which bears an anticipated educational feature normally concealed by said substance.

3. In a device of the character described, the combination of a soluble body and two related delineations located at a fixed distance apart, said soluble body concealing one of said delineations.

4. A handle for a soluble body bearing a delineation so situated that said delineation will be concealed when said handle is partially imbedded in said body.

5. An educational device consisting of a revealed delineated conception associated with a piece of an edible compound which has hidden therein a delineation related to said conception, said delineation being disclosed upon the solution of some of the outer portion of said compound.

6. An educational device consisting of a piece of candy with a question showing on the outside thereof and an answer to said question hidden in the body of the candy.

7. In combination, an article consisting of a piece of candy and a handle therefor, said handle displaying a visible delineation and having another related delineation normally concealed by the candy.

8. In a device of the character described, the combination of a relatively stiff and soluble body, a visible delineation and a second delineation related thereto hidden by said body.

9. In combination, an edible substance, an inedible body and an anticipated delineation located on said body and concealed by said substance.

10. A device for imparting information consisting of a soluble compound and a visible question and an answer thereto normally concealed by said soluble compound.

11. An educational device consisting of a soluble body concealing a delineated conception which is anticipated by a normally visible, delineated conception.

12. An educational device consisting of a soluble body associated with a revealed, delineated conception and concealing an interpretation of said conception.

13. A device for arousing and satisfying curiosity, consisting of a soluble body associated with a curiosity arousing delineation and an answer to said delineation situated so as to be revealed upon the solution of said body.

In witness whereof I have hereunto set my hand and affixed my seal this first day of September, 1923.

CHARLES CLINTON ALVORD. [L. S.]

Attest:
 CLINTON ALVORD,
 HELEN COUMING.

Certificate of Correction.

It is hereby certified that in Letters Patent No. 1,502,006, granted July 22, 1924, upon the application of Charles Clinton Alvord, of Worcester, Massachusetts, for an improvement in "Educational Articles," an error appears in the printed specification requiring correction as follows: Page 2, after line 109, insert the following as claims 14 and 15:

*14. As an article of manufacture, a piece of candy having a handle embedded therein, said handle displaying a visible delineation and having another related delineation normally concealed by the candy and adapted to be disclosed when a portion or all of the candy is dissolved.*

*15. As an article of manufacture, a piece of candy having a handle embedded therein, said handle displaying a visible delineation and having another related delineation normally overlaid by the candy and adapted to be uncovered when the candy is dissolved.;* and that the said Letters Patent should be read with this correction therein that the same may conform to the record of the case in the Patent Office.

Signed and sealed this 14th day of October, A. D. 1924.

[SEAL.]

KARL FENNING,
*Acting Commissioner of Patents.*